(12) United States Patent  
Nakamura et al.

(10) Patent No.: US 9,182,791 B2  
(45) Date of Patent: Nov. 10, 2015

(54) ELECTRONIC APPARATUS

(71) Applicant: Kabushiki Kaisha Toshiba, Tokyo (JP)

(72) Inventors: Toshikatsu Nakamura, Akishima (JP); Toshikazu Shiroishi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 173 days.

(21) Appl. No.: 14/080,506

(22) Filed: Nov. 14, 2013

(65) Prior Publication Data

US 2014/0307380 A1    Oct. 16, 2014

(30) Foreign Application Priority Data

Apr. 11, 2013  (JP) .................................. 2013-083017

(51) Int. Cl.  
  *G06F 1/16*  (2006.01)
(52) U.S. Cl.  
  CPC ..................... *G06F 1/1683* (2013.01)
(58) Field of Classification Search  
  CPC .............................. G06F 1/1633; G06F 1/1637  
  See application file for complete search history.

(56) References Cited

U.S. PATENT DOCUMENTS

| | | | | |
|---|---|---|---|---|
| 7,292,290 B2* | 11/2007 | Miyagawa et al. | ............. | 349/58 |
| 8,389,865 B2* | 3/2013 | Chikahisa | ..................... | 174/255 |
| 2005/0151041 A1 | 7/2005 | Tatsukami et al. | | |
| 2009/0027839 A1* | 1/2009 | Miyata | ..................... | 361/679.21 |
| 2009/0213534 A1* | 8/2009 | Sakai | ..................... | 361/679.21 |

FOREIGN PATENT DOCUMENTS

| | | |
|---|---|---|
| JP | 06-324759 | 11/1994 |
| JP | 2005-196059 | 7/2005 |

* cited by examiner

*Primary Examiner* — Anthony Q Edwards  
(74) *Attorney, Agent, or Firm* — Rutan & Tucker LLP; William W. Schaal

(57) ABSTRACT

According to one embodiment, an electronic apparatus includes a first portion, a second portion, a hinge, a display, a touch panel, a second board, a third board, and a wiring portion. The first portion includes a first board. The second board is connected to the display. At least part of the second board is located between the display and a first end of the second portion. The third board is connected to the touch panel. At least part of the third board is located between the display and a second end of the second portion. The wiring portion extends between the first portion and the second portion. The wiring portion connects the first board to the second board and the first board to the third board.

10 Claims, 10 Drawing Sheets

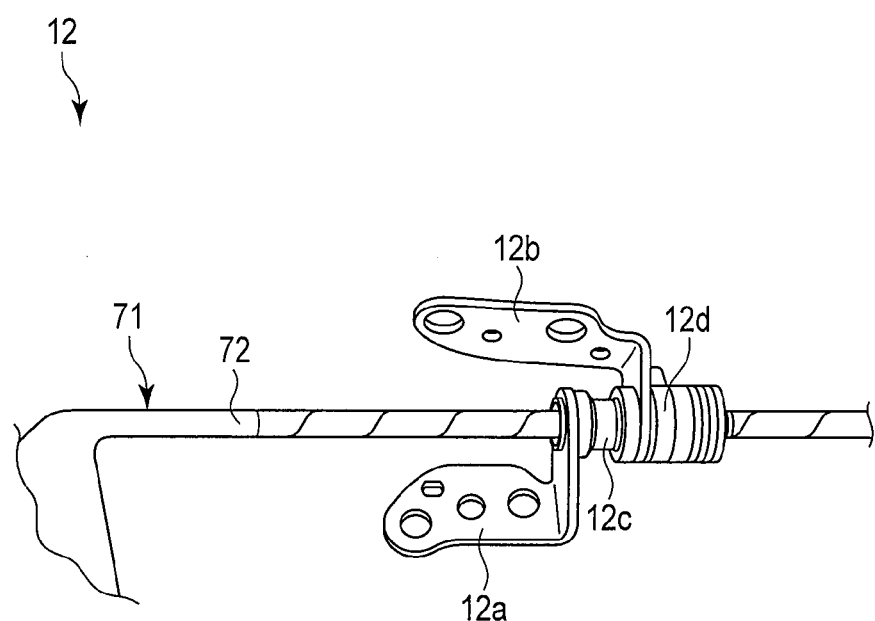
F I G. 2

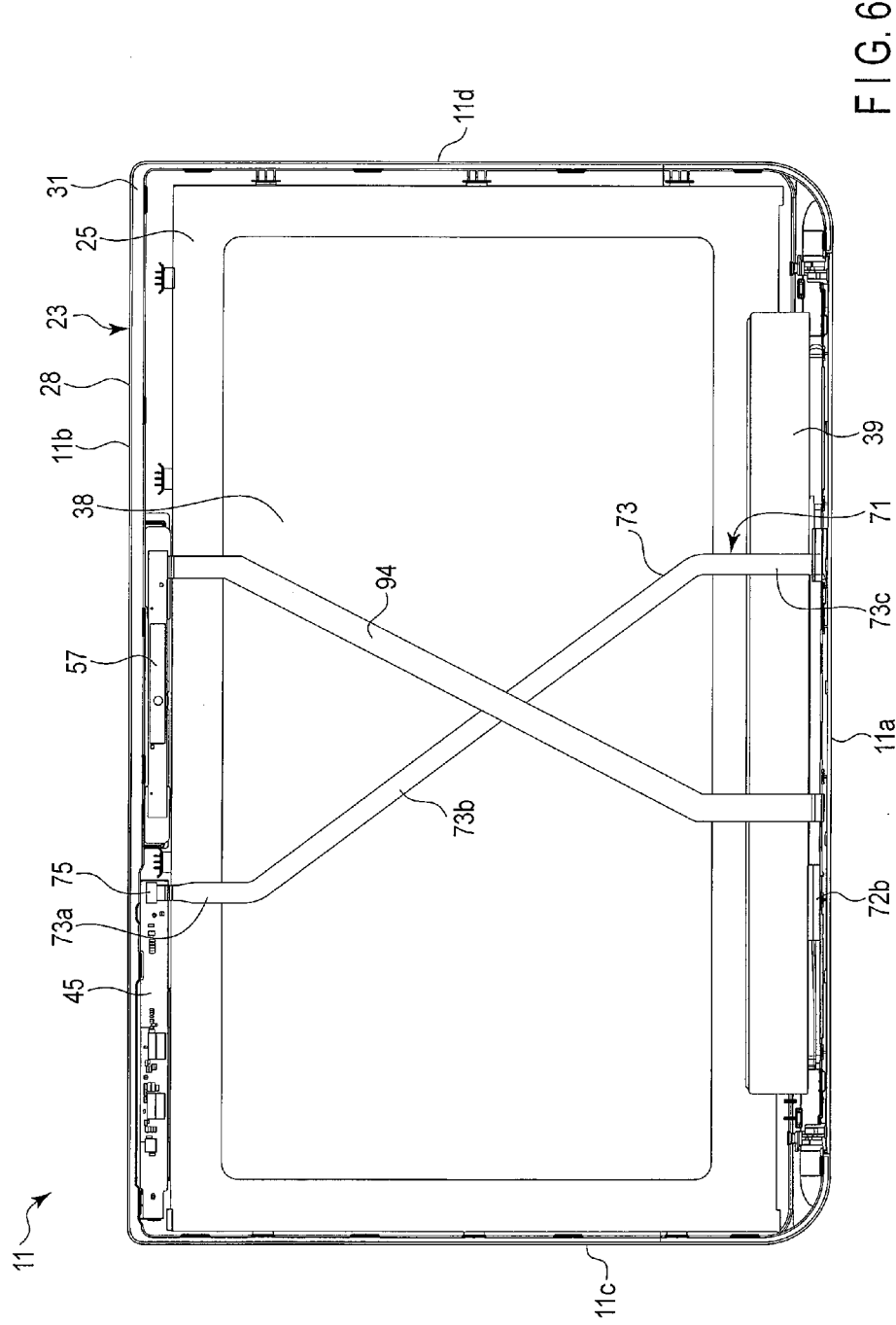
F I G. 6

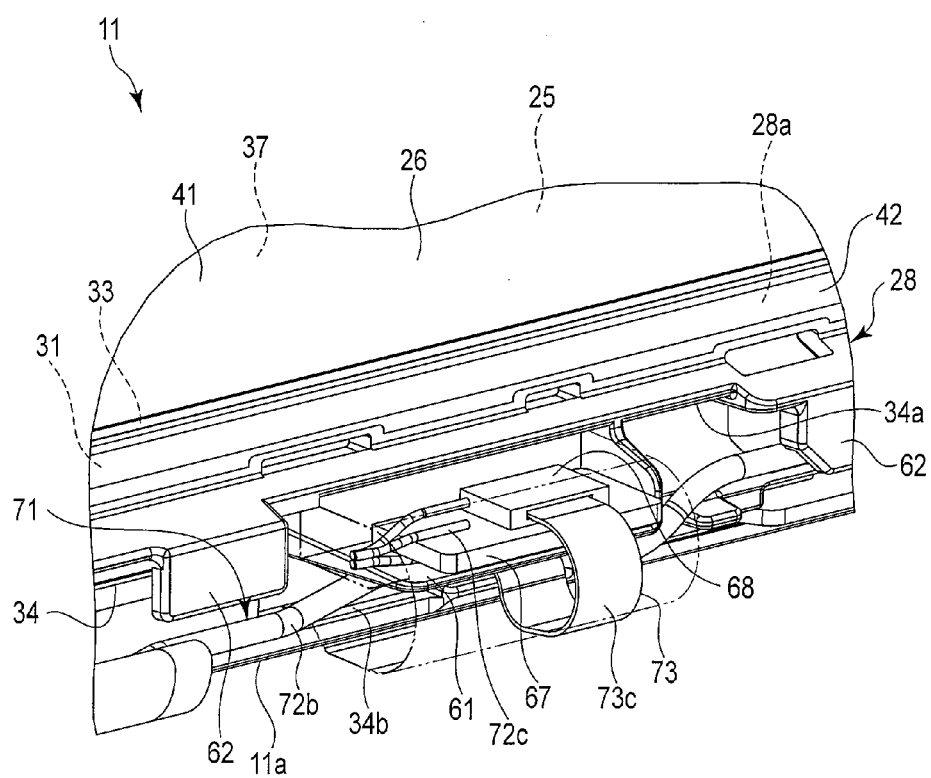
F I G. 9

ELECTRONIC APPARATUS

CROSS-REFERENCE TO RELATED APPLICATIONS

This application is based upon and claims the benefit of priority from Japanese Patent Application No. 2013-083017, filed Apr. 11, 2013, the entire contents of which are incorporated herein by reference.

FIELD

Embodiments described herein relate generally to electronic apparatuses.

BACKGROUND

An electronic apparatus such as a portable computer comprises a display and various kinds of components, the display configured to display an image.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary perspective view showing a hinge of the embodiment;

FIG. 6 is an exemplary rear view of an inside of the display unit of the embodiment;

FIG. 9 is an exemplary perspective view showing a part of the display unit of the embodiment.

DETAILED DESCRIPTION

Various embodiments will be described hereinafter with reference to the accompanying drawings.

In general, according to one embodiment, an electronic apparatus comprises a first portion, a second portion, a hinge, a display, a touch panel, a second board, a third board, and a wiring portion. The first portion comprises a first board. The second portion comprises a first end, a second end opposite the first end, and a housing. The housing comprises an opening. The hinge rotatably connects the first portion and the first end of the second portion. The display is in the housing and comprises a display surface. The display surface is exposed through the opening and configured to display an image. The touch panel covers the display surface. The second board is connected to the display. At least part of the second board is located between the display and the first end of the second portion. The third board is connected to the touch panel. At least part of the third board is located between the display and the second end of the second portion. The wiring portion extends between the first portion and the second portion. The wiring portion connects the first board to the second board and the first board to the third board.

Hereinafter, an embodiment is described referring to FIGS. 1 to 10. In the present specification, it is defined that a frontward side (i.e., a user side) is referred to as front, a far side viewed from a user is referred to as rear, a left side viewed from the user is referred to as left, a right side viewed from the user is referred to as right, an upward side viewed from the user is referred to as above, and a lower side viewed from the user is referred to as below. Some components are expressed by two or more terms. Those terms are just examples. Those components may be further expressed by another or other terms. And the other components which are not expressed by two or more terms may be expressed by another or other terms. Each figure illustrates the embodiment schematically, and thus, size of each element shown in the figure may be different from that of the element explained in the embodiment.

Figure 1:
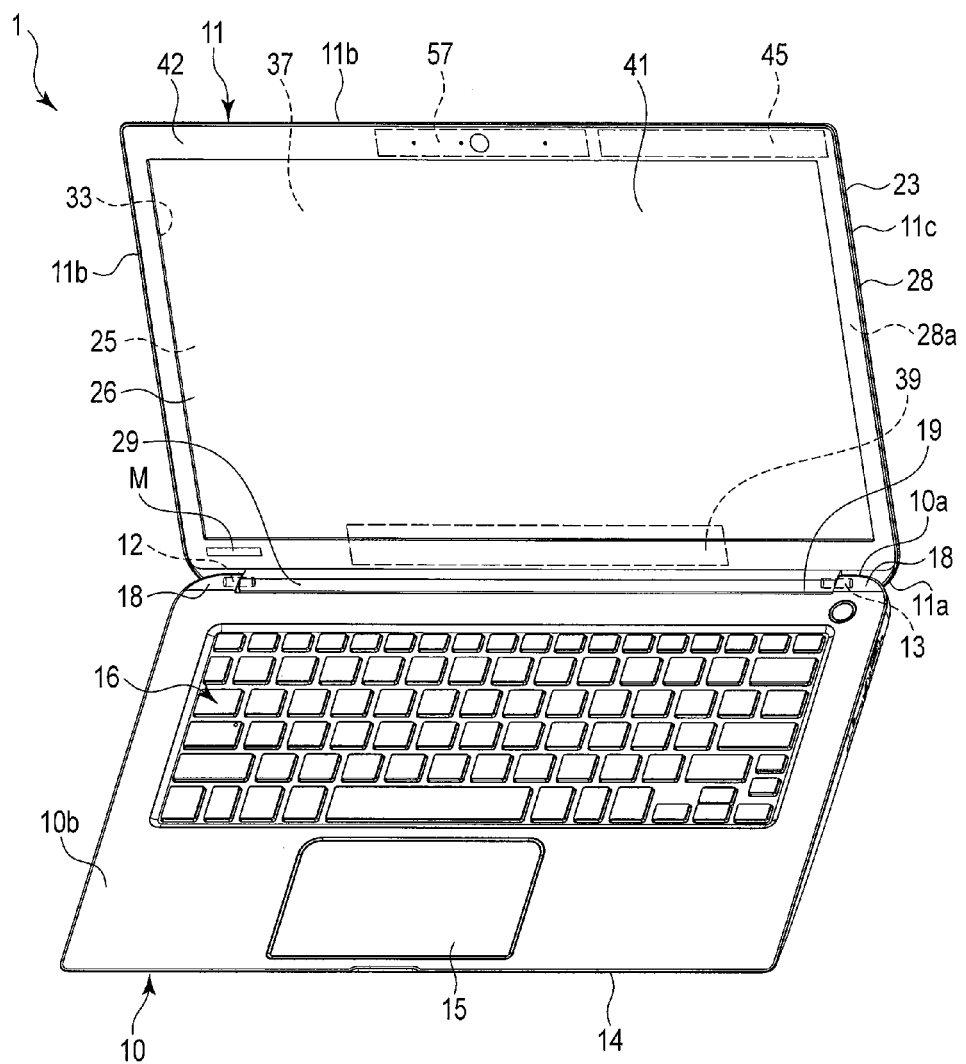
FIG. 1 is an exemplary perspective view showing a portable computer of one embodiment.

FIG. 1 is an exemplary perspective view showing a portable computer 1 of one embodiment. The portable computer 1 is an example of an electronic apparatus. Here, the electronic apparatus is not limited to the portable computer and may be various other apparatuses such as a tablet device, a mobile phone, a smart phone and a mobile gaming device, etc.

As shown in FIG. 1, the portable computer 1 comprises a main unit 10, a display unit 11, and a pair of hinges 12 and 13. The main unit 10 is an example of a first portion. The display unit 11 is an example of a second portion. Each of the main unit 10 and the display unit 11 is formed in a rectangular plate-like shape. The form of the main unit 10 or the display unit 11 is not limited to the rectangular plate-like shape.

FIG. 2 is an exemplary perspective view showing one hinge 12. The other hinge 13 is structured the same as that of the hinge 12, and thus, explanation thereof is omitted. As shown in FIG. 2, the hinge 12 is a so-called hollow hinge through which a cable can pass. The hinge 12 comprises a first fixing portion 12a, a second fixing portion 12b, a first tube 12c, and a first tube 12d.

Each of the first tube 12c and the second tube 12d is formed in a tubular shape. The internal diameter of the second tube 12d is slightly greater than that of the first tube 12c. The first tube 12c is rotatably fitted inside the second tube 12d.

The first fixing portion 12a and the first tube 12c are integrated together. The second fixing portion 12b and the second tube 12d are integrated together. Thereby, the second fixing portion 12b is rotatable around the central axes of the first and second tubes 12c and 12d with respect to the first fixing portion 12b.

The first fixing portion 12a is in the form of a plate and is fixed to a rear end 10a of the main unit 10 by, for example, a screw. The second fixing portion 12b is in the form of a plate and is fixed to a lower end 11a of the display unit 11 by, for example, a screw.

As can be understood from the above, the pair of hinges 12 and 13 connects the rear end 10a of the main unit 10 to the lower end 11a of the display unit 11. In other words, the hinges 12 and 13 are provided over the main unit 10 and the display unit 11. The lower end 11a of the display unit 11 is an example of a first end of the second portion.

As shown in FIG. 1, the hinge 12 is located in the left ends of the main unit 10 and display unit 11. The hinge 13 is located in the right ends of the main unit 10 and display unit 11. The display unit 11 is rotatable with respect to the main unit 10 by means of the hinges 12 and 13.

The display unit 11, for example, rotates with respect to the main unit 10 between first and second positions. The display unit 11 overlaps with the main unit 10 in its thickness direction at the first position. The display unit 11 rises up from the rear end 10a of the main unit 10 at the second position. Here, FIG. 1 illustrates the display unit 11 at the second position. The present application explains a case where the display unit 11 is at the second position and the main unit 10 is on a placement surface (e.g., upper surface) of, for example, a desk. Thus, for example, when the display unit 11 is at the first position, the lower end 11a of the display unit 11 may not be at the lowermost position of the display unit 11.

The main unit 10 comprises a base housing 14, a touch pad 15, and a keyboard 16. The touch pad 15 and keyboard 16 may be referred to as an interface, input device and the like.

The touch pad 15 and the keyboard 16 are provided on the upper surface 10b of the main unit 10. The upper surface 10b of the main unit 10 is covered with the display unit 11 when the display unit 11 is at the first position. A plurality of legs are configured to contact the placement surface of the desk are provided on the lower surface of the main unit 10 which is opposite to the upper surface 10b.

The rear end 10a of the main unit 10 includes a pair of protrusions 18 and a recess 19. The protrusions 18 protrude rearward from the rear end 10a. The protrusions 18 are located on the right end and left end of the main unit 10, respectively. The first fixing portion 12a of the hinge 12 is located in the protrusion 18. The recess 19 is located between the protrusions 18, that is, the recess 19 is defined by the protrusions 18.

Figure 3:
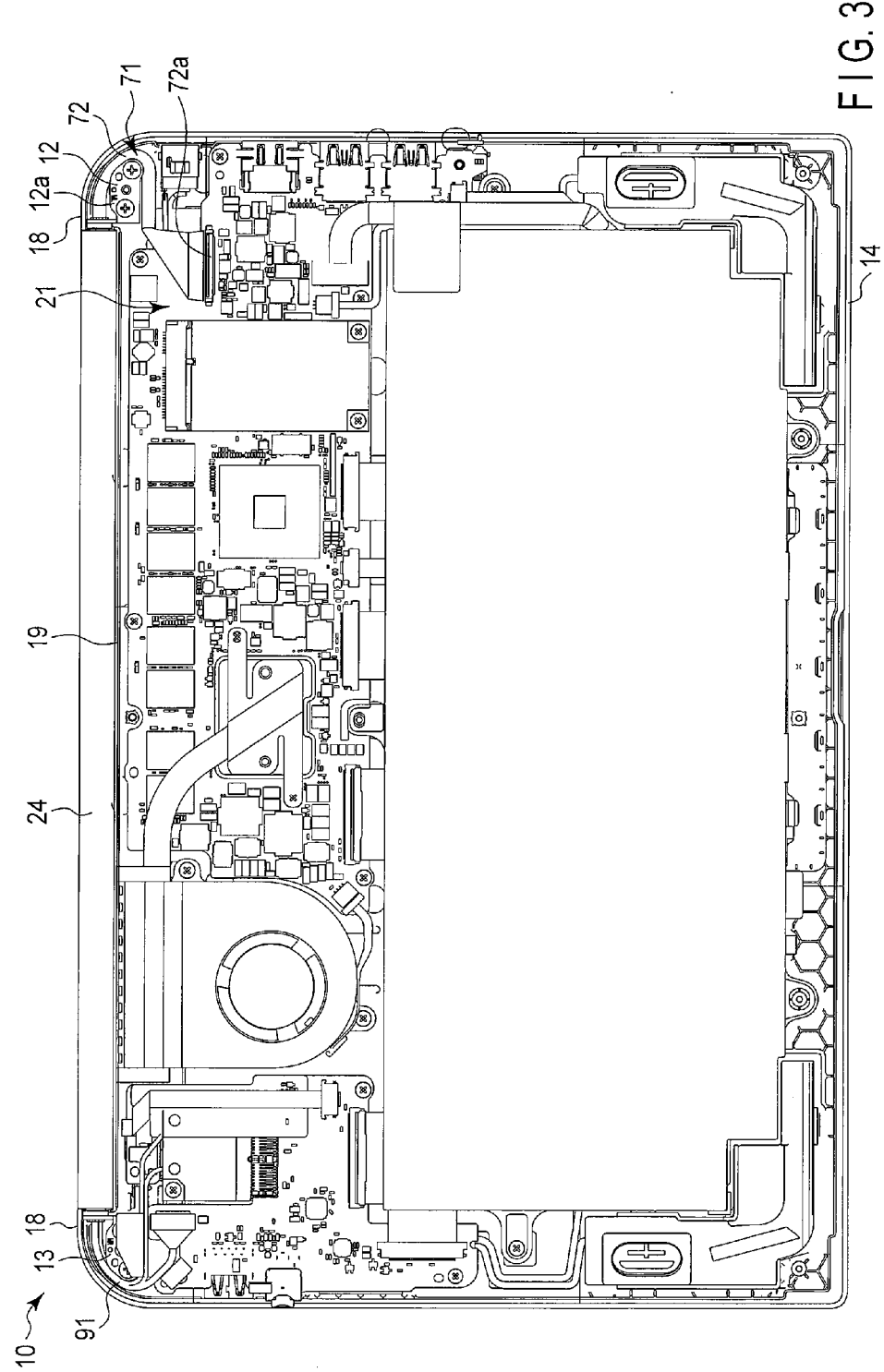
FIG. 3 is an exemplary plane view showing an inside of a main unit of the embodiment.

FIG. 3 is an exemplary plane view illustrating the inside of the main unit 10 viewed from below with a member (e.g., bottom cover) forming the lower surface of the main unit 10 removed. As shown in FIG. 3, the main unit 10 comprises a mother board 21. The mother board 21 is an example of a first board and may be referred to as a module, component, and the like. The first board is not limited thereto and may be other various boards such as relay board and graphic board.

The mother board 21 is accommodated in the base housing 14. On the mother board 21, various components such as an MPU, SSD, memory, connector, condenser and cooling device are mounted.

Figure 4:
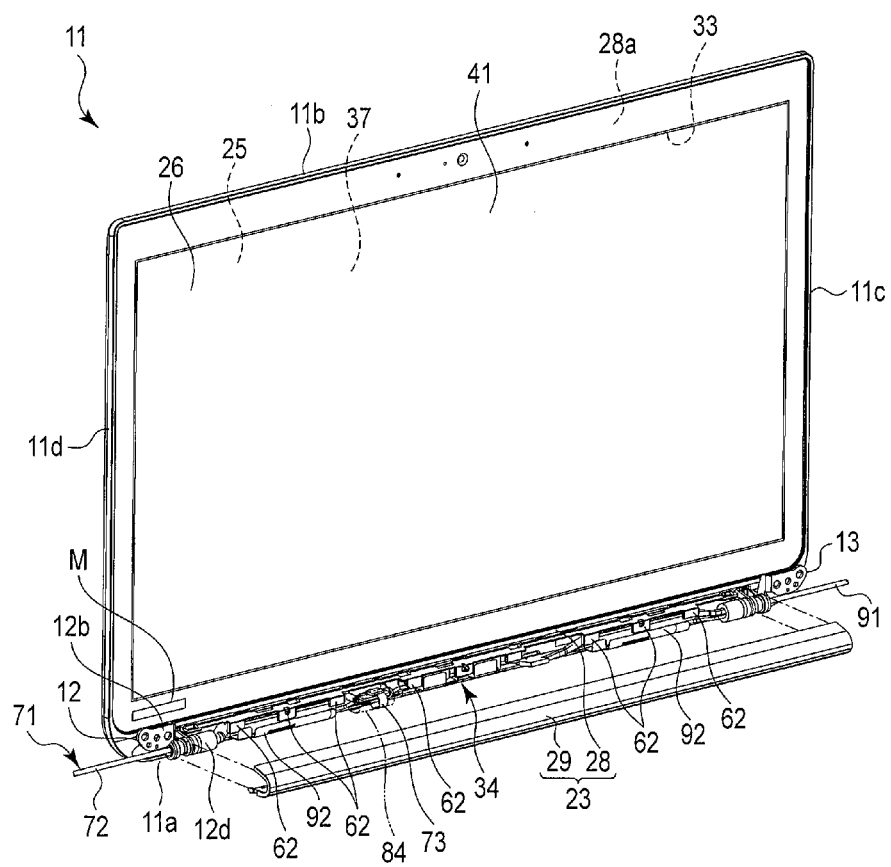
FIG. 4 is an exemplary exploded perspective view showing a display unit of the embodiment.

FIG. 4 is an exemplary perspective view of the disassembled display unit 11. As shown in FIG. 4, the display unit 11 comprises a display housing 23, a liquid crystal display (LCD) 25, and a touch panel 26.

The display housing 23 is an example of a housing and may be referred to as an outer shell, wall, cover, and the like. The LCD 25 is an example of a display and may be referred to as a display device, module, component, and the like. The display is not limited to the LCD 25, and may be other kinds such as organic electroluminescent display, and the like.

The display housing 23 comprises a display cover 28 and a hinge cap 29. The display cover 28 may be referred to as a housing, outer shell, wall, and the like. The hinge cap 29 is an example of a cover member and may be referred to as a hinge cover, a part of housing, protrusion, and the like.

The display unit 11 comprises a lower end 11a, an upper end 11b, a right end 11c, and a left end 11d. The upper end 11b is an example of a second end and is at a position opposite to the lower end 11a. The right end 11c and left end 11d extend to a direction substantially orthogonal to the lower end 11a and the upper end 11b. The left end 11d is located opposite to the right end 11c.

Figure 5:
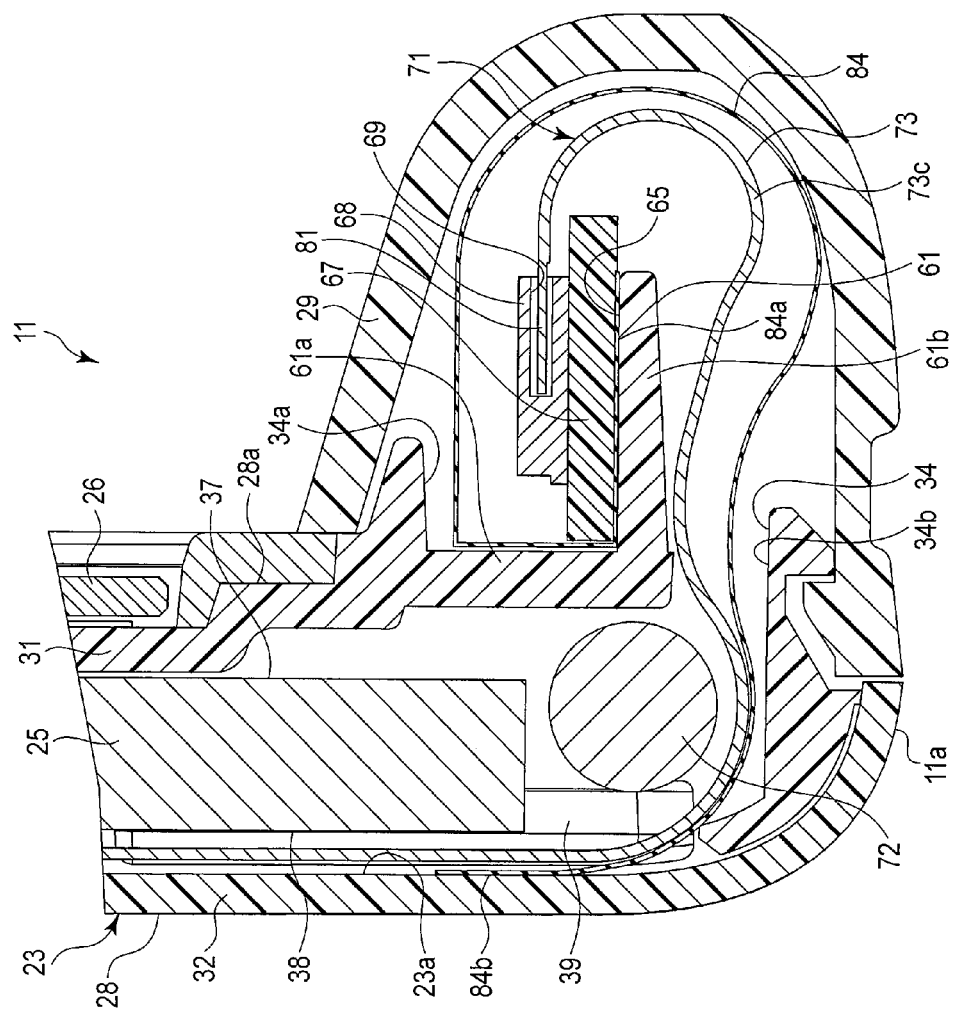
FIG. 5 is an exemplary cross-sectional view showing a part of the display unit of the embodiment.

FIG. 5 is an exemplary cross-sectional view showing the periphery of the lower end 11a of the display unit 11. As shown in FIG. 5, the display cover 28 comprises a front cover 31, a rear cover 32, an opening 33, and an exposure port 34. The front cover 31 and the rear cover 32 may be referred to as an outer shell portions, wall portions, covers, and the like. The opening 33 and the exposure port 34 may be referred to as hole, aperture, and the like.

The front cover 31 forms a front surface 28a of the display cover 28. The front surface 28a is an example of the surface of the display cover. When the display unit 11 is at the first position, the front surface 28a is hidden as facing the upper surface 10b of the main unit 10. The front cover 31 is connected to the rear cover 32 by, for example, hook and screw to form the display cover 28.

As shown in FIG. 4, the opening 33 is located in substantially the center of the front surface 28a of the display cover 28. The opening 33 is, for example, a substantially rectangular hole. The opening 33 may be covered with a light-transmitting material such as a glass plate or an acryl plate.

The exposure port 34 is located at the lower end 11a of the display unit 11. The exposure port 34 is provided at the front surface 28a of the display cover 28. The exposure port 34 extends in the width direction of the display unit 11 along the lower end 11a of the display unit 11 (i.e., a direction from the right end 11c to the left end 11d of the display unit 11). The exposure port 34 is smaller than the opening 33.

The hinge cap 29 is provided at the lower end 11a of the display unit 11. The hinge cap 29 is, for example, a cover having a U-shaped cross-section. The hinge cap 29 is attached to the display cover 28 to project from the front surface 28a of the display cover 28. The hinge cap 29 covers the exposure port 34 and is stored in the recess 19 of the main unit 10. In other words, the hinge cap 29 is located between the protrusions 18 of the main unit 10.

The LCD 25 is formed in a rectangular plate-like shape and is accommodated in the display cover 28. As shown in FIG. 5, the LCD 25 comprises a display surface 37 and a rear surface 38. At least a part of the display surface 37 is exposed through the opening 33 and displays an image based on a signal input to the LCD 25. Here, in the present application, the term "image" includes both still and moving pictures. The rear surface 38 is located opposite to the display surface 37. The rear surface 38 is formed of an insulating material, or may be formed of a conductive material.

FIG. 6 is an exemplary rear view showing the inside of the display unit 11 with the rear cover 32 removed. As shown in FIG. 6, an LCD control board 39 is attached to the LCD 25. The LCD control board 39 is an example of the second board. The LCD control board 39 is a rectangular printed circuit board. The LCD control board 39 is connected to the LCD 25 to control the LCD 25.

At least a part of the LCD control board 39 is located between the LCD 25 and the lower end 11a of the display unit 11. Here, the LCD control board 39 may be located at any position between the LCD 25 and the lower end 11a of the display unit 11 in the height direction (i.e., in a direction from the lower end 11a to the upper end 11b of the display unit 11). That is, the LCD control board 39 may be dislocated from a region between the LCD 25 and the lower end 11a of the display unit 11 in the thickness direction (i.e., a direction from the display surface 37 to the rear surface 38 of the LCD 25).

Figure 7:
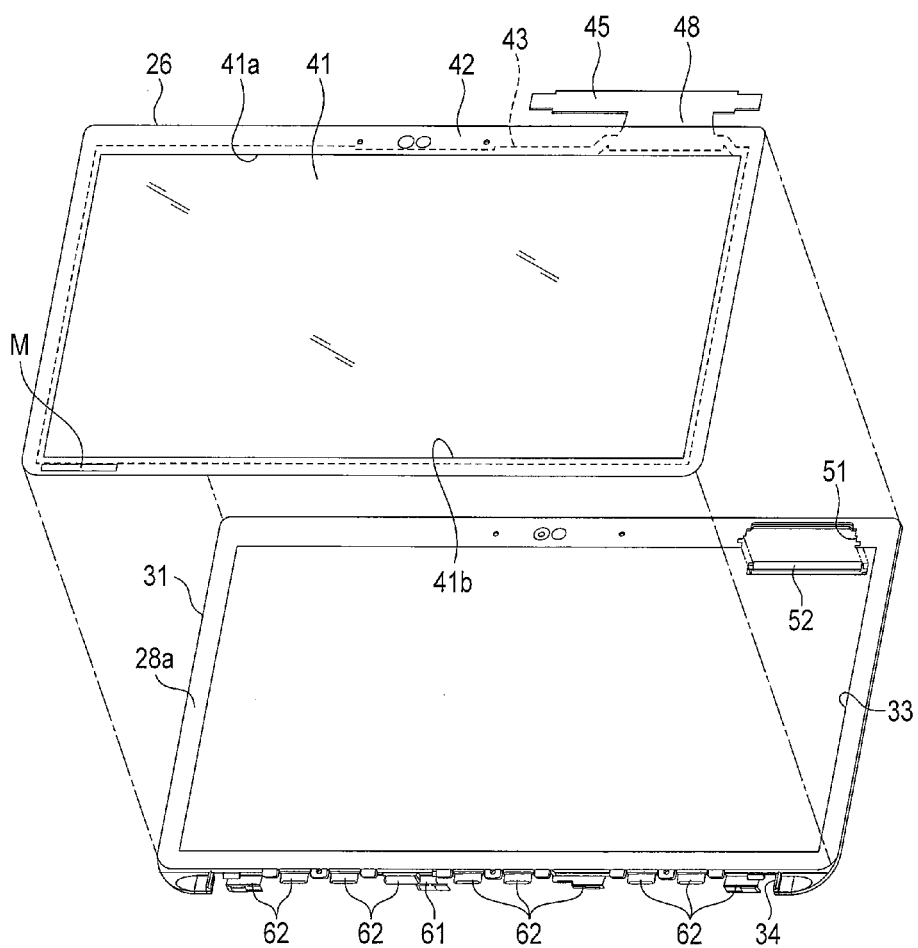
FIG. 7 is an exemplary exploded perspective view showing a touch panel and a front cover of the embodiment.

FIG. 7 is an exemplary perspective view showing the touch panel 26 and the front cover 31 both disassembled. As shown in FIG. 7, the touch panel 26 is in the form of a rectangular plate. The touch panel 26 is an electrostatic touch panel. A user controls the portable computer 1 by, for example, placing his finger on or close to the touch panel 26. The touch panel 26 is not limited to the electrostatic touch panel and may be any other device to sense an object contacting or approaching a screen (i.e., touch panel 26) by means of various kinds of elements such as electricity, light, pressure, and the like for controlling the portable computer 1.

The touch panel 26 is attached to the front cover 31 covering the opening 33. The touch panel 26 is attached to the front surface 28a of the display cover 28 by, for example, double-sided adhesive tape.

The touch panel 26 comprises a transparent area 41, frame 42, and scanning line wiring 43. The transparent area 41 is located in substantially the center of the touch panel 26 as a substantially rectangular region corresponding to the opening 33. The transparent area 41 is transparent and covers the display surface 37 of the LCD 25 via the opening 33. The display surface 37 is visually recognizable for a user through the transparent area 41. The transparent area 41 may be colored palely to the extent that the display surface 37 is visually recognizable.

The frame 42 surrounds the transparent area 41 as a frame-shaped region. The frame 42 is a portion where the rear surface of the touch panel 26 is colored. The rear surface of the touch panel 26 is a surface attached to the front cover 31. In the front surface 28a of the display cover 28, the peripheral region of the opening 33 is covered with the frame 42.

The scanning line wiring 43 is provided in the frame 42. As shown in FIG. 7 with dotted line, the scanning line wiring 43 includes a plurality of wiring patterns formed on the rear surface of the touch panel 26. The scanning line wiring 43 surrounds the transparent area 41 and is connected to scanning lines provided on the transparent area 41.

The touch panel control board 45 is connected to the touch panel 26. The touch panel control board 45 is an example of a third board. The touch panel control board 45 is a rectangular printed circuit board.

The touch panel control board 45 comprises a flexible connecting wiring 48. The connecting wiring 48 is, for example, a flexible printed circuit board (FPC). The connecting wiring 48 is connected to the scanning line wiring 43. In other words, the touch panel control board 45 is connected to the scanning line wiring 43. The connecting wiring 48 is connected to the scanning line wiring 43 above and right of the transparent area 41.

The width of the scanning line wiring 43 becomes narrower in proportion to the distance from the joint of the scanning line wiring 43 and the connecting wiring 48. Thereby, the width of the scanning line wiring 43 along the upper side 41a of the transparent area 41 is wider than that of the scanning line wiring 43 along the lower side 41b of the transparent area 41. The width of the scanning line wiring 43 in the lower left of the transparent area 41 is narrower than that of the scanning line wiring 43 in the other regions of the transparent area 41.

An emblem portion M is provided in the frame 42. The emblem portion M is, for example, a logotype printed on the rear surface of the touch panel 26. The region in which the emblem portion M is provided is visually recognizable since no coloring is applied thereto. The emblem portion M is located at the lower left of the transparent area 41. In other words, the emblem portion M is adjacent to the region where the width of the scanning line wiring 43 is narrowest.

The front cover 31 further comprises a cut-off 51 and a plate member 52. The cut-off 51 is a recess at an edge of the opening 33. The cut-off 51 may be a recess at an outer periphery of the front cover 31. The cut-off 51 is provided at a position corresponding to the joint of the scanning line wiring 43 and the connecting wiring 48.

Figure 8:
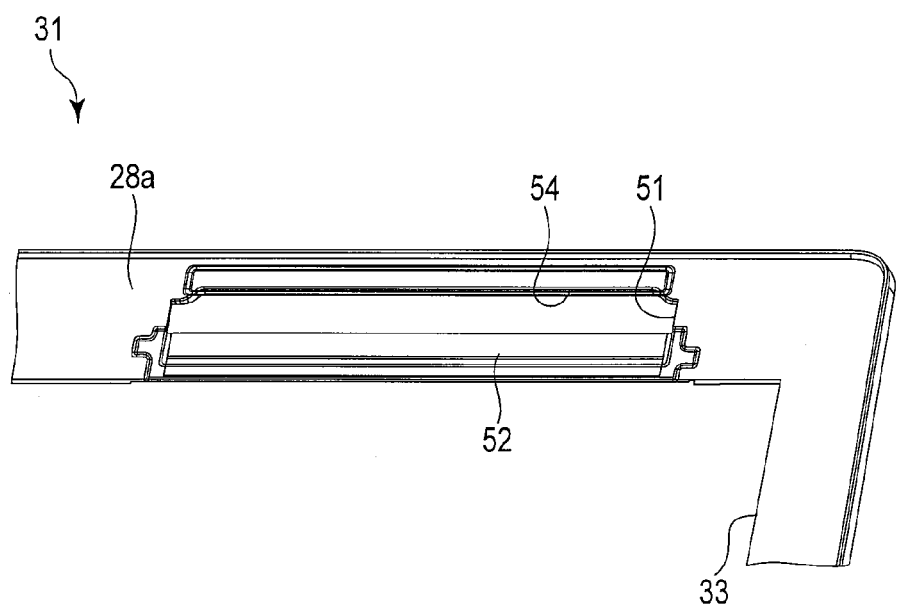
FIG. 8 is an exemplary perspective view showing a part of the front cover of the embodiment.

FIG. 8 is an exemplary perspective view showing the enlarged periphery of the cut-off 51 of the front cover 31. As shown in FIG. 8, the plate member 52 is attached to the cut-off 51 to form a substantially rectangular through hole 54. The connecting wiring 48 of the touch panel control board 45 passes through the through hole 54. Thus, the touch panel control board 45 is located inside the display housing 23.

As shown in FIG. 6, at least a part of the touch panel control board 45 is located between the LCD 25 and the upper end 11b of the display unit 11 with the connecting wiring 48 bent. Here, the touch panel control board 45 may be at any position between the LCD 25 and the upper end 11b of the display unit 11 in the height direction. That is, the touch panel control board 45 may be dislocated from a region between the LCD 25 and the upper end 11b of the display unit 11 in the thickness direction.

The touch panel control board 45 is located upper right of the LCD 25 (e.g., upper left in FIG. 6). In other words, the touch panel control board 45 is placed close to the right end 11c of the display unit 11 rather than the left end 11d thereof.

The display unit 11 further comprises a camera module 57. The camera module is an example of an electronic component. The camera module is located between the LCD 25 and the upper end 11b of the display unit 11. The camera module 57 is located in substantially the center of the width direction of the display unit 11 and aligns with the touch panel control board 45. In other words, the touch panel control board 45 and the camera module 57 are located in a space defined between the LCD 25 and the upper end 11b of the display unit 11.

FIG. 9 is an exemplary perspective view showing the enlarged periphery of the exposure port 34 of the display unit 11. As shown in FIG. 9, the front cover 31 comprises an attachment portion 61 and a plurality of protrusions 62. The attachment portion 61 and the protrusions 62 may be referred to as supporting portions or tongue portions.

The attachment portion 61 and the protrusions 62 are plate-like portions projecting from the upper edge 34a of the exposure port 34 toward the inside of the exposure port 34. In other words, the attachment portion 61 and the protrusions 62 partly cover the exposure port 34. The attachment portion 61 and the protrusions 62 may project from the lower edge 34b of the exposure port 34. The upper edge 34a of the exposure port 34 is adjacent to the touch panel 26. The lower edge 34b of the exposure port 34 is located opposite to the upper edge 34a and adjacent to the lower end 11a of the display unit 11.

The attachment portion 61 and the protrusions 62 are aligned in the width direction of the display unit 11. The attachment portion 61 is located between two of the protrusions 62. The attachment portion 61 is located close to the left end 11d of the display unit 11 rather than the right end 11c thereof.

As shown in FIG. 5, the attachment portion 61 comprises a first wall 61a and a second wall 61b. The first wall 61a extends from the upper edge 34a of the exposure port 34 parallel to the front surface 28a of the display cover 28. The second wall 61b extends from the tip of the first wall 61a in a direction substantially orthogonal to the front surface 28a of the display cover 28. The second wall 61b projects toward the outside of the display cover 28. In other words, the second wall 61b extends in a direction of projection of the hinge cap 29. The attachment portion 61 is L-shaped.

The second wall 61b of the attachment portion 61 comprises an attachment surface 65. The attachment surface 65 is a surface facing the upper end 11b of the display unit 11. A relay board 67 is attached to the attachment surface 65. The relay board 67 is, for example, a printed circuit board.

A relay connector 68 is mounted on the relay board 67. The relay connector is an example of a second connector. The relay connector 68 comprises an insertion port 69. The insertion port 69 faces the outside of the display cover 28. In other words, the insertion port 69 faces in the direction of projection of the hinge cap 29.

As shown in FIG. 3 to FIG. 6, the portable computer 1 further comprises a wiring portion 71. The wiring portion 71 is provided between the main unit 10 and the display unit 11. The wiring portion 71 connects the mother board 21 to both the LCD control board 39 and the touch panel control board 45.

The wiring portion 71 comprises a coaxial cable 72, a flexible printed circuit board (FPC) 73, and the relay connector 68 mentioned above. The coaxial cable 72 is an example of a first wiring member. The FPC 73 is an example of a second wiring member.

The coaxial cable 72 comprises a first end 72a (FIG. 3), a second end 72b (FIG. 6), and a third end 72c (partly shown in FIG. 9). In other words, the coaxial cable 72 is forked. As shown in FIG. 3, the first end 72a of the coaxial cable 72 is connected to the mother board 21.

The coaxial cable 72 passes through the first and second tubes 12c and 12d of the hinge 12. Thus, the coaxial cable 72 is wired across the main unit 10 and the display unit 11.

The coaxial cable 72 in the display unit 11 through the hinge 12 enters the display housing 23 through the exposure port 34. The coaxial cable 72 passes between the rear cover 32 and the protrusions 62 and extends in the width direction of the display unit 11.

As shown in FIG. 6, the second end 72b of the coaxial cable 72 is connected to the LCD control board 39. For example, the second end 72b is inserted into a connector mounted on the LCD control board 39. The mother board 21 inputs signals to the LCD control board 39 via the coaxial cable 72. The LCD control board 39 displays an image on the display surface 37 of the LCD 25 based on the signals.

As partly shown in FIG. 9, the third end 72c of the coaxial cable 72 is connected to the relay board 67. The third end 72c is connected to the relay connector 68 via at least a wiring pattern of the relay board 67.

Figure 10:
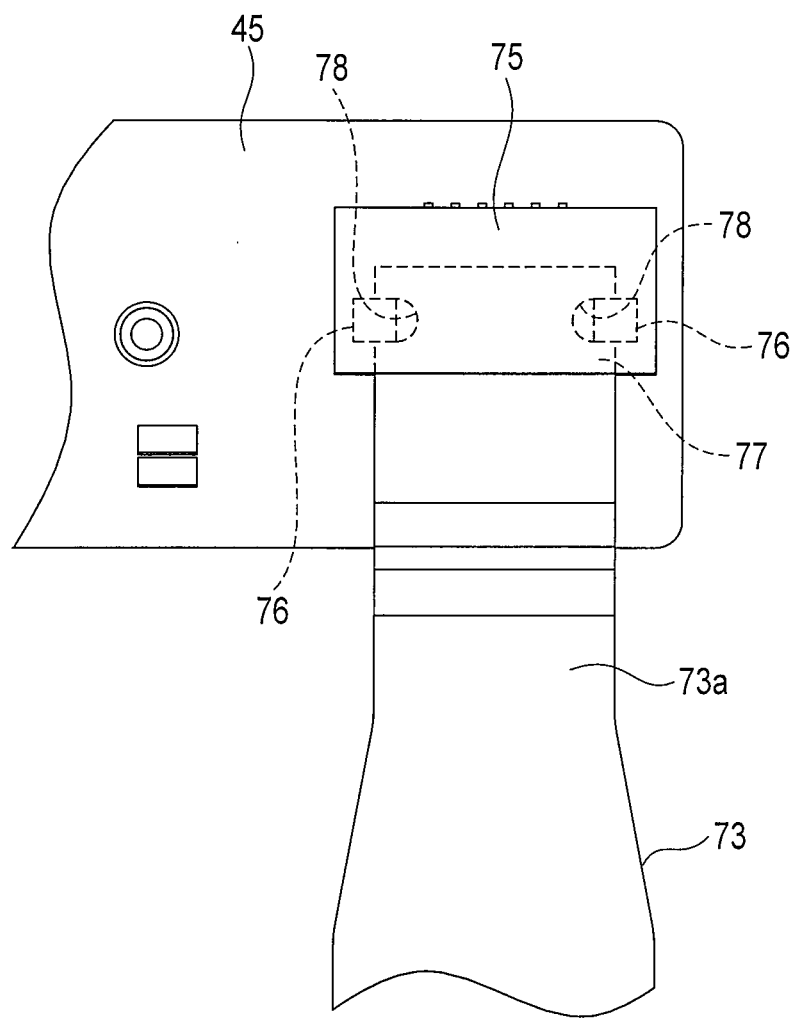
FIG. 10 is an exemplary plane view showing a part of a touch panel control board and an FPC of the embodiment.

FIG. 10 is an exemplary plane view showing a part of the touch panel control board 45 and the FPC 73. As shown in FIG. 10, the touch panel control board 45 comprises a connector 75. The connector 75 is an example of a first connector. The connector 75 comprises a pair of locking pins 76. The locking pins are movable in the thickness direction of the connector 75.

The FPC 73 comprises a first connecting portion 77 and a pair of locking portions 78. The first connecting portion 77 is one end of the FPC 73. The locking portions 78 are notches provided on the first connecting portion 77 and may be referred to as engaging portions.

The first connecting portion 77 is inserted in the connector 75. Thereby, the FPC 73 is connected to the touch panel control board 45.

After the first connecting portion 77 has been inserted in the connector 75, the locking pins 76 are locked in the locking portions 78. In other words, the locking portions 78 are locked by the locking pins 76. Here, the locking pins 76 are, before the insertion of the first connecting portion 77 into the connector 75, kept out of the slot of the connector 75 to which the first connecting portion 77 is inserted.

The locking pins 76 are locked in the locking portions 78, and thereby, the first connecting portion 77 is prevented from falling off the connector 75. The locking portions 78 locked in the connector 75 are not limited to notches and may be, for example, holes to which the locking pins are inserted.

As shown in FIG. 6, the FPC 73 passes over the rear surface 38 of the LCD 25. In other words, the FPC 73 passes between the rear surface 38 of the LCD 25 and the rear cover 32. Here, the expression "passes over the rear surface 38" means that the FPC 73 is extended along the rear surface 38. The FPC 73 may be in contact with or distant from the rear surface 38.

The FPC 73 comprises a first linear portion 73a, a crossing portion 73b, and a second linear portion 73c. The linear portion 73a extends from the first connecting portion 77 in the height direction.

The crossing portion 73b extends obliquely with respect to the first linear portion 73a. The crossing portion 73b extends from the end of the first linear portion 73a in the lower left direction (e.g., lower right direction in FIG. 6). The crossing portion 73b crosses the center of the display unit 11 in the height direction, and furthermore, the crossing portion 73b crosses the center of the display unit 11 in the width direction.

The second linear portion 73c extends from the end of the crossing portion 73b. The second linear portion 73c extends parallel to the first linear portion 73a. As shown in FIG. 5, the second linear portion 73c reaches the outside of the display cover 28 through the exposure port 34.

The FPC 73 comprises a second connecting portion 81. The second connecting portion 81 is the other end of the FPC 73, and provided on the end of the second linear portion 73c. The second connecting portion 81 is inserted into the insertion port 69 of the relay connector 68. Thus, the second linear portion 73c of the FPC 73 is bent to go under the attachment portion 61.

The second connecting portion 81 comprises the same notches as that of the locking portions 78. On the other hand, the relay connector 68 comprises the same pins as that of the locking pins 76. With this mechanism, the second connecting portion 81 is locked in the relay connector 68.

The second connecting portion 81 is inserted in the relay connector 68, the mother board 21 is connected to the touch panel control board 45 through the coaxial cable 72, the relay board 67, the relay connector 68, and the FPC 73. The coaxial cable 72 connects the mother board 21 and the second connecting portion 81 of the FPC 73 through the relay board 67 and the relay connector 68.

As mentioned above, the coaxial cable 72 is connected to the relay connector 68 and the FPC 73 is inserted in the insertion port 69 of the relay connector 68. That is, the relay connector 68 is an example of a joint of the first and second wiring members. Here, the coaxial cable 72 extends in a direction perpendicular to the FPC 73. The relay connector 68 is located between the LCD 25 and the lower end 11a of the display unit 11 in the height direction. Therefore, the FPC 73 is connected to the coaxial cable 72 between the LCD 25 and the lower end 11a of the display unit 11. The coaxial cable 72 may be connected directly to the FPC 73 by means of, for example, soldering.

The relay connector 68 is attached to the attachment portion 61 projecting from the upper edge 34a of the exposure port 34. The second linear portion 73c of the FPC 73 reaches the outside of the display cover 28 through the exposure port 34. That is, the exposure port 34 exposes a connecting portion (e.g., relay connector 68) between the FPC 73 and the coaxial cable 72.

The display unit 11 comprises an insulating member 84 (i.e., insulator). The insulating member 84 is indicated in a double-dotted line in FIG. 9. The insulating member 84 is a rectangular sheet which is elastic and nonconductive. The insulating member 84 is not limited thereto.

As shown in FIG. 5, the first end 84a of the insulating member 84 is interposed between the second wall 61b of the attachment portion 61 and the relay board 67. The first end 84a of the insulating member 84 is attached to the second wall 61b of the attachment portion 61 by, for example, an adhesive agent. In other words, one end of the insulating member 84 is fixed to the display housing 23. The relay board 67 is attached to the first end 84a of the insulating member 84 by, for example, double-sided adhesive tape. In other words, the relay board 67 is attached to the attachment portion 61 via the insulating member 84.

The insulating member 84 extends along the first wall 61a of the attachment portion 61 and is bent to circle around the second linear portion 73c of the FPC 73. Thereby, the insulating member 84 covers the relay board 67, relay connector 68, and the second linear portion 73c of the FPC 73 as shown in FIG. 9. In other words, the insulating member 84 covers the joint between the FPC 73 and the coaxial cable 72.

As shown in FIG. 5, the bent insulating member 84 passes through the exposure port 34 and enters the display cover 28. The insulating member 84 passes between the FPC 73 and the inner surface 23a of the display housing 23.

The second end 84b of the insulating member 84 elastically contact to the inner surface 23a of the display housing 23. The second end 84b is located opposite to the first end 84a of the insulating member 84. The insulating member 84 is held and kept bending by, for example, friction between the second end 84b of the insulating member 84 and the inner surface 23a of the display housing 23. The display housing 23 may comprise, for example, rubber configured to lock the second end 84b of the insulating member 84 by friction, a member configured to clip the second end 84b, and a projection configured to fit in a hole provided in the second end 84b.

The joint between the coaxial cable 72 and the FPC 73 and the insulating member 84 covering the joint are covered with the hinge cap 29. In other words, the joint between the coaxial cable 72 and the FPC 73 and the insulating member 84 covering the joint are accommodated in the hinge cap 29. The hinge cap 29 further covers the hinges 12 and 13.

As shown in FIG. 3, the portable computer 1 comprises a connection cable 91. The connection cable 91 is, for example, a coaxial cable. One end of the connection cable 91 is connected to the mother board 21.

The connection cable 91 is wired across the main unit 10 and the display unit 11 through the hinge 13. As shown in FIG. 4, the connection cable 91 is connected to two antennas 92 in the display unit 11. The antennas 92 are located between the LCD 25 and the lower end 11a of the display unit 11 in the height direction.

As shown in FIG. 6, a component wiring 94 is connected to the camera module 57. The component wiring 94 is, for example, a flexible printed circuit board. The component wiring 94 passes over the rear surface 38 of the LCD 25 and crosses the FPC 73 on the rear surface 38 of the LCD 25. The component wiring 94 is connected to the connection cable 91.

In the portable computer 1 of the above-mentioned embodiment, the LCD control board 39 is located between the LCD 25 and the lower end 11a of the display unit 11. On the other hand, the touch panel control board 45 is located between the LCD 25 and the upper end 11b of the display unit 11. Between the LCD 25 and the upper end 11c of the display unit 11, various components such as camera module 57, etc. may be provided and the touch panel control board 45 may be aligned in the width direction of the display unit 11 with such components.

Furthermore, between the LCD 25 and the lower end 11a of the display unit 11, various components such as the hinges 12 and 13, the LCD control board 39, the coaxial cable 72, and the connection cable 91, etc. may be provided. Therefore, if the touch panel control board 45 is provided between the LCD 25 and the lower end 11a of the display unit 11, a large space is needed between the LCD 25 and the lower end 11a. The enlargement of this space may upsize the portable computer 1.

As described above, the touch panel control board 45 is provided in the periphery of the upper end 11b of the display unit 11, and thus, the size (or length) of the display unit 11 can be smaller as compared to a case where the touch panel control board 45 is provided in the periphery of the lower end 11a of the display unit 11. Furthermore, the thickness of the display unit 11 can be thinner as compared to a case where the touch panel control board 45 overlaps the LCD 25 in the thickness direction of the LCD 25. As a result, the portable computer 1 can be smaller.

Furthermore, the LCD control board 39 is provided between the LCD 25 and the lower end 11a, and the touch panel control board 45 is provided between the LCD 25 and the upper end 11b. This structure results in the distance between the LCD 25 and the lower end 11a being substantially equal to that between the LCD 25 and the upper end 11b. Thereby, the exterior appearance of the portable computer 1 is improved.

The FPC 73 is not extended between the LCD 25 and the right end 11c or left end 11d of the display unit 11 but passes over the rear surface 38 of the LCD 25. Thereby, the width of the display unit 11 is suppressed, and the portable computer 1 is miniaturized. Furthermore, the wiring portion 71 is shortened. In other words, the FPC 73 passes the shortest distance between the connector 75 and the relay connector 68. Thereby, low voltage due to the resistance of the wiring portion 71 and noise in the signals transferred by the wiring portion 71 can be restricted.

The wiring portion 71 passes over the rear surface 38 of the LCD 25. With this structure, even when a part of the wiring portion 71 is arranged to pass over the rear surface 38 of the LCD 25, the thickness of the display unit 11 can be suppressed. Thereby, the portable computer 1 can be miniaturized.

The first connecting portion 77 of the FPC 73 comprises the locking portion 78 locked in the connector 75. Thereby, the FPC 73 is prevented from falling off the connector 75 even when the FPC 73 is not fixed by, for example, adhesive tape. In other words, the size of the portable computer 1 is suppressed since such a member to fix the FPC 73, for example adhesive tape, is unnecessary.

The insulating member 84 covers the joint between the coaxial cable 72 and the FPC 73. With this structure, even when static electricity may occur inside the display housing 23, the static electricity is restricted from transferring to the coaxial cable 72 or FPC 73 and possible damage on the mother board 21, LCD control board 39, touch panel control board 45, and the like is also restricted.

The insulating member 84 is in the form of an elastic sheet. The first end 84a of the insulating member 84 is fixed to the attachment portion 61 and the second end 84b contacts the inner surface 23a of the display housing 23 elastically. Thereby, the insulating member 84 covers the relay connector 68 and is easily removed therefrom to expose the relay connector 68 in case of need. Thereby, productivity and maintainability of the portable computer 1 are improved.

The joint between the coaxial cable 72 and the FPC 73 is exposed from the exposure port 34. Thus, it is easy to join the coaxial cable 72 and the FPC 73. Furthermore, since the joint is covered by the insulating member 84, static electricity entering the inside through a gap between the display cover 28 and the hinge cap 29 is restricted from reaching the mother board 21, the LCD control board 39, and the touch panel control board 45 via the wiring portion 71. Thereby, the reliability of the portable computer 1 is improved.

The insertion port 69 of the relay connector 68 faces the direction of projection of the hinge cap 29. That is, the insertion port 69 of the relay connector 68 faces the outside of the display cover 28. Therefore, the second connecting portion 81 of the FPC 73 can be inserted in the insertion port 69 without difficulty, and productivity of the portable computer 1 is improved.

The FPC 73 passes over the rear surface 38 of the LCD 25 and is inserted in the insertion port 69 of the relay connector 68 facing the direction of projection of hinge cap 29 which projects from the front surface 28a of the display cover 28. The second linear portion 73c of the FPC 73 is wired to be round widely and thus, the bent portion of the FPC 73 has a large radius of curvature. With this structure, stress on the bent FPC 73 is reduced and breaking down of the FPC is restricted.

Between the LCD 25 and the upper end 11b of the display unit 11, the touch panel control board 45 and the camera module 57 are aligned. Since a plurality of components are arranged between the LCD 25 and the upper end 11b of the display unit 11, extension of the length of the display unit 11 is restricted, and the portable computer 1 is miniaturized.

One electronic apparatus described above comprises a second board between a first end of a second portion, and a third board between the display and a second end of the second portion. The electronic apparatus can be miniaturized.

The embodiments are not limited to the above-described embodiments, but the components according to the above-described embodiments may be changed without departing from the scope and spirit of the invention. In addition, a plurality of components according to the above-described embodiments may be appropriately combined with each other to form various structures. For example, some components may be removed from all components according to the above-described embodiments. In addition, components according to different embodiments may be appropriately combined with each other.

For example, the wiring portion 71 is wired through the hinge 12 in the above embodiment; however, the wiring portion 71 may be wired through the main unit 10 and the other portions of the display unit 11 to be extended between the main unit 10 and the display unit 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a first portion comprising a first board;
   a second portion comprising a first end, a second end opposite the first end, and a housing, the housing comprising an opening;
   a hinge rotatably connecting the first portion and the first end of the second portion;
   a display in the housing, the display comprising a display surface exposed through the opening and configured to display an image;
   a touch panel covering the display surface;
   a second board connected to the display, at least part of the second board located between the display and the first end of the second portion;
   a third board connected to the touch panel, at least part of the third board located between the display and the second end of the second portion; and
   a wiring portion extending between the first portion and the second portion, the wiring portion connecting the first board to the second board and the first board to the third board.

2. An electronic apparatus of claim 1, wherein
   the display comprises a rear surface opposite the display surface, and
   a part of the wiring portion which connects the first board to the third board overlaps the rear surface of the display.

3. An electronic apparatus of claim 2, wherein
   the wiring portion comprises a flexible printed circuit board connected to the third board and overlapping the rear surface of the display.

4. An electronic apparatus of claim 1, wherein
   the third board comprises a first connector, and
   the wiring portion comprises a first connecting portion inserted in the first connector and a locking portion on the first connecting portion, the locking portion configured to engage with the first connector.

5. An electronic apparatus of claim 1, wherein
   the wiring portion comprises a first wiring member connected to the first board and a second wiring member connected to the third board, the second wiring member connected to the first wiring member between the first end of the second portion and the display, and
   the second portion comprises an insulator in the housing, the insulator covering a joint between the first wiring member and the second wiring member.

6. An electronic apparatus of claim 5, wherein
   the insulator is an elastic sheet, the insulator bent in order to cover the joint between the first wiring member and the second wiring member,
   one end of the insulator is fixed to the housing of the second portion, and
   the other end of the insulator elastically contacts an inner surface of the housing.

7. An electronic apparatus of claim 6, wherein
   the housing of the second portion comprises a display cover and a cover member,
   the display cover accommodates the display and comprises the opening and an exposure port, the exposure port configured to expose the joint between the first wiring member and the second wiring member,
   the cover member covers the exposure port and the joint between the first wiring member and the second wiring member.

8. An electronic apparatus of claim 7, wherein
   the cover member projects from the display cover,
   the wiring portion comprises a second connector to which the first wiring member is connected, the second connector comprising an insertion port facing in a projecting direction of the cover member, the second wiring member is inserted in the insertion port of the second connector.

9. An electronic apparatus of claim 8, wherein
   the display cover comprises a surface, the surface comprising the opening, and
   the cover member projects from the surface of the display cover.

10. An electronic apparatus of claim 1, further comprising an electronic component located between the display and the second end of the second portion, the electronic component aligned with the third board.

* * * * *